UNITED STATES PATENT OFFICE.

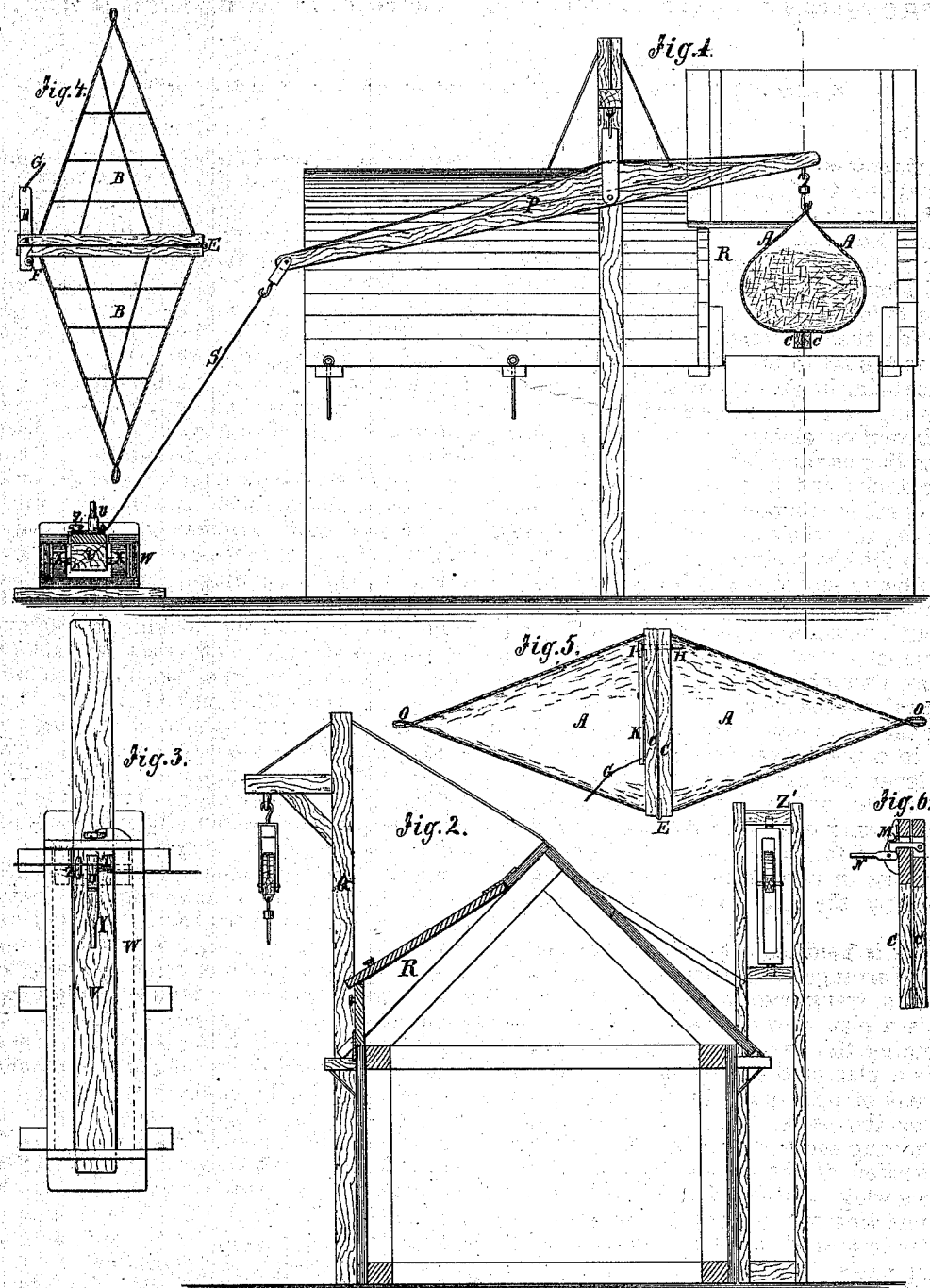

ALEXANDER SMITH, OF HOOSICK FOUR CORNERS, NEW YORK.

IMPROVEMENT IN APPARATUS FOR UNLOADING AND MOVING HAY.

Specification forming part of Letters Patent No. 115,120, dated May 23, 1871.

*To all whom it may concern:*

Be it known that I, ALEXANDER SMITH, of Hoosick Four Corners, in the county of Rensselaer and State of New York, have invented a new and Improved Apparatus for Unloading and Moving Hay; and I do hereby declare that the following is a full, clear, and exact description thereof, which will enable others skilled in the art to make and use the same, reference being had to the accompanying drawing forming part of this specification.

This invention relates to improved apparatus for unloading hay and depositing it upon a hay-mow or stack; and it consists in a sling, of canvas or other equivalent substance, adapted for holding the whole or part of a load, being placed on the hay-rack before loading, and capable of being separated readily at the bottom for discharging the load suspended in it; also, a long and powerful lever suspended from a derrick erected by the side of the barn or stack, with a rope attachment to the end of the long arm for raising the short one, and so suspended that the load may be swung from over the wagon to a point over the mow or stack, to which lever the sling is attached when the load is driven under it, and raised thereby, and then swung over the mow and separated by a trip-cord for delivering. The invention also consists in apparatus to be used in connection with the hoisting-rope for swinging the lever.

Figure 1 is a side elevation of the unloading apparatus arranged in connection with a barn. Fig. 2 is a transverse section of the same. Fig. 3 is a plan view of the apparatus I use for swinging the hay over the mow or stack. Fig. 4 is a plan of the sling, showing one arrangement of apparatus for connecting and detaching the parts. Fig. 5 is another plan view, showing another arrangement; and Fig. 6 is a section of the connecting-bars of the sling, showing another arrangement of the said connecting and detaching apparatus.

Similar letters of reference indicate corresponding parts.

The sling consists of two triangular pieces, A, of canvas or webs of cord B, or any equivalent thereof, attached at the base to a wood bar, C, for each, which are hinged together at one end, and provided at the other end with catching and detaching apparatus of any approved sort. For instance, in Fig. 1, D represents a catch pivoted to one of the bars, and catching a point of the other bar behind a stud-pin, F, on the catch, which will be tripped by a cord, G, on the other end, pulled in the direction indicated; or, as in Fig. 5, a turning-key, H, pivoted in one bar, so as to pass through a slot in the other when the two come together, and having a broad bit on the end so passing through, and a cam-shaped projection, I, on the other end, may be used, being adjusted by hand for locking the two parts, and having a trip-lever, K, and cord G combined with it, as shown, for tripping it; or another arrangement, such as shown in Fig. 6, may be used, said arrangement comprising a catch, L, held in the locking position by a spring, M, and a tripping-lever, N. The said parts A or B of the sling are provided with loops O at the apex for hooking to the lever. This sling is stretched across the hay-rack previous to loading, and the load placed upon it, so that the whole load may be lifted at once; or, if the load be too large, another sling may be stretched across the wagon when half loaded. P is the unloading-lever, swung from a derrick, Q, at the side of the barn or stack, so that it may swing horizontally on its support; and it is arranged so that the short end, to which the sling is connected for hoisting, as shown in Fig. 1, may be swung on a hatchway, R, in the roof of the barn. The long arm of the lever has a rope, S, attached for pulling it down by horse-power or otherwise, and this rope is passed through a pulley, T, and over a clamping-block, U, on a bar, V, arranged in a bed-frame, W, anchored in the ground, to slide to and fro as much as the long arm is intended to swing, so that the pulley may be caused to move for swinging the lever; and the said bar is provided with rollers X to reduce the friction, said rollers being confined within a chamber in the bed, arranged suitably for the bar to be moved. Y is a hinged clamping-lever, arranged in connection with the clamping-block U for holding the rope while it is released from the power by which the lever is worked, and secured by belaying the rope around the cleat Z.

I propose to rig two derricks—one on one side of a barn and one on the other—and on one side I make two hatchways through the roof, say about midway between the derrick, which is placed at the center; and the cords and this derrick I arrange so that it may be swung around to deposit the hay at either hatch, while on the other side I make the hatch in the center and arrange the derrick at one side of it.

The derrick represented at Q is the one I prefer for swinging the lever from one hatch to the other, while the other form, as at Z′, may be used when the lever is to swing only from the load to the place of depositing and back.

With this apparatus a load of hay may be very economically and quickly removed from the wagon and deposited.

Having thus described my invention, I claim as new and desire to secure by Letters Patent—

1. The improved hay-sling, composed of two parts, A or B, and hinged bars C, the latter being provided with holding and tripping apparatus, all substantially as specified.

2. The combination of a sling, such as herein described, with a hoisting-lever and derrick, substantially as specified.

3. The combination, with the hoisting-lever and rope S, of the holding and sliding bar V and a guide or pulley, T, substantially as specified.

4. The combination, with sliding holding-bar V and pulley or guide T, of the clamp U Y and the belaying-cleat Z, all substantially as specified.

ALEXANDER SMITH.

Witnesses:
J. MERRITT BROTT,
JOHN CALLAN.